Jan. 19, 1937.  P. L. CRITTENDEN  2,068,377
LUBRICATING DEVICE
Original Filed Oct. 31, 1933

INVENTOR
PHILIP L. CRITTENDEN
BY Wm. M. Cady
ATTORNEY

Patented Jan. 19, 1937

2,068,377

UNITED STATES PATENT OFFICE 2,068,377

LUBRICATING DEVICE

Philip L. Crittenden, Edgewood, Pa., assignor to The Westinghouse Air Brake Company, Wilmerding, Pa., a corporation of Pennsylvania Original application October 31, 1933, Serial No. 695,995. Divided and this application May 19, 1934, Serial No. 726,519

1 Claim. (Cl. 184—6)

This invention relates to lubricating devices, particularly lubricating devices for supplying fluid lubricant to the bearings of rotating members, such as crank shafts, this application being a division of my co-pending application, Serial No. 695,995, filed October 31, 1933, now Patent 2,017,684 also assigned to the assignee of this application.

The usual manner of supplying fluid lubricant to the bearings of rotating members, such as crank shafts, is to collect in a trough or groove the splash of fluid lubricant from the crank case or to collect fluid lubricant centrifugally thrown from connecting rod bearings and pumped to them from the crank case, the collected lubricant then flowing by gravity to the crank shaft bearings.

Such lubrication has the disadvantage that due to the time initially required to supply fluid lubricant to the crank shaft bearings, the bearings frequently remain unlubricated long enough to cause considerable wear thereof, resulting in noisy and improper operation of the crank shaft. This is especially true upon first use of the apparatus or upon subsequent operation after a long period of disuse, when the bearings are completely dry.

It is thus, the principal object of my invention, to ensure proper initial lubrication of the bearings for rotating members, such as crank shafts, and thus prevent service or maintenance expense incident to repair or replacement of worn bearings.

More specifically, it is an object of my invention to provide, in a simple and inexpensive manner, means whereby fluid lubricant may flow by gravity from the crank case filling spout directly to the crank shaft bearings.

Figure 1:
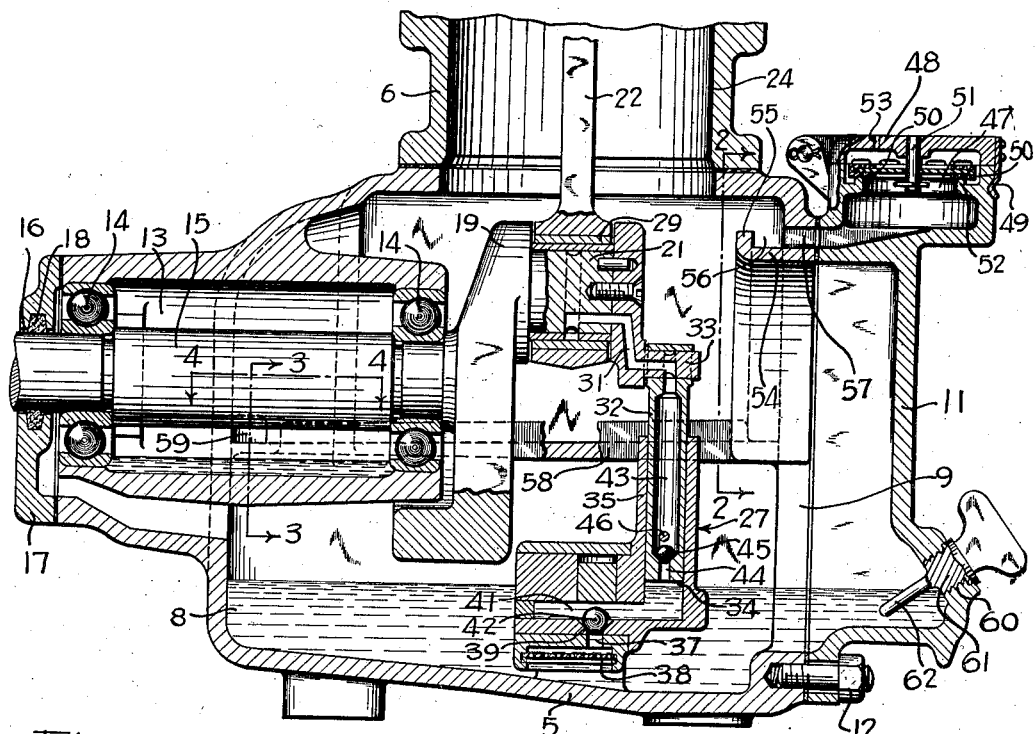
Figure 3:
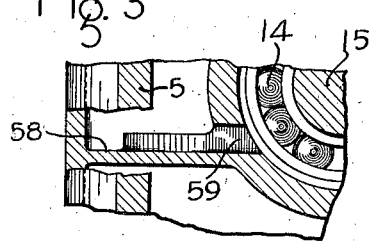
Figure 2:
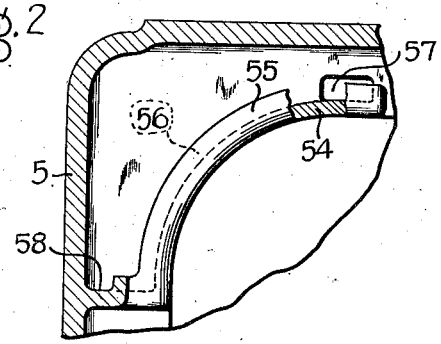
Figure 4:
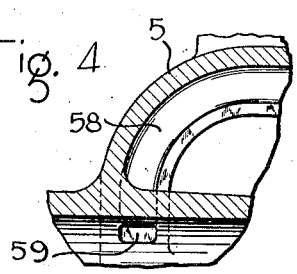

Other objects and advantages will be made apparent in the subsequent description of one embodiment of my invention when read in connection with the accompanying drawing, wherein Figure 1 is a fragmentary vertical sectional view through a single stage compressor to which my invention is illustratively applied, and Figures 2, 3, and 4 are fragmentary sectional views, taken on lines 2—2, 3—3, and 4—4, respectively, showing details of my invention.

In Figure 1 is shown the basic details of a compressor having a sectional casing comprising a crank case section 5, and a cylinder or piston section 6, the crank case section 5 defining a crank chamber 8 which has a relatively large end opening 9. A casing section 11 is provided for closing the end opening 9 and is suitably secured to the crank case section 5 by screws or bolts 12, one of which is shown.

In the wall of the crank case section 5 opposite the end opening 9, a tubular journal member is supported which encloses a bearing chamber 13 having therein suitable anti-friction bearings, such as the ball bearings 14, for supporting a rotatable crank shaft 15. The crank shaft 15 extends exteriorly of the journal member and through an opening 16 in a closure member 17 that is secured to the journal member and casing section 5 by means of screws or bolts, not shown. A packing ring 18 in the closure member 17 serves to seal the opening 16 against fluid lubricant leakage therethrough.

The compressor may be driven by any form of motor device such as an electric motor or internal combustion engine that is connected to the exterior portion of the crank shaft 15.

The crank shaft 15 is provided with a counterbalanced crank arm 19 having a crank pin 21 to which is connected in the usual manner a connecting rod 22 for operating a compressor piston, not shown, in the bore 24 of the cylinder section 6, so that as the crank shaft 15 is rotated, the piston is reciprocated.

Connecting rod 22 is provided with a bearing 29 engaging crank pin 21, and fluid lubricant from crank chamber 8 is supplied thereto by means of a reciprocating pump 27 operated by rotation of the crank shaft 15.

Pump 27 may comprise a tubular piston 32 which is pivotally secured to a crank pin 33 eccentric to the center of rotation of crank shaft 15, and which is thus reciprocated within a piston chamber 34 in a tubular casing or cylinder member 35 upon rotation of crank shaft 15, the cylinder member 35 being provided with a trunnion portion pivotally mounted within a bearing 36 secured to the crank case section 5 to permit angular movement thereof in following the movement of crank pin 33.

The bearing 36 is provided with a fluid lubricant intake opening 37 and a screen 38 extending across the opening 37 to prevent foreign particles from entering or passing through opening 37. A tapered opening 39, in the trunnion portion of the cylinder member 35, which is connected to chamber 34 through a bore 41, registers with opening 37 and is provided with a ball check valve 42 which serves to permit fluid lubricant to flow from the crank case chamber 8 into bore 41 but which prevents a reflux of the fluid from the bore 41.

The piston 32 contains a longitudinal bore 43 therein that opens at its upper end into a passage 31 in the crank pin 33, which passage extends through crank shaft 15 to the outer surface of the crank pin 21, thus opening at the connecting rod bearing 29. Piston 32 is also provided, at its lower end, with a fluid lubricant inlet port 44 and a ball check valve 45 disposed in bore 43 adapted to permit fluid lubricant to pass through port 44 into bore 43 from chamber 34 and to close port 44 to prevent reflux of fluid lubricant from bore 43. A pin 46, extending across the piston within bore 43, serves to limit the upward or opening movement of the ball check valve 45.

It will thus be apparent from the foregoing that when the crank shaft 15 is rotated to reciprocate piston 32, fluid lubricant from crank chamber 8 is drawn into chamber 34 upon the upward stroke of piston 32, and forced past ball check valve 45 through bore 43 and passage 31 to the bearing 29 of the connecting rod 22 upon a downward stroke of piston 32.

A filling spout or opening 47 is provided at the top of casing section 11 through which fluid lubricant is poured into the crank chamber 8. Any suitable cap or cover may be provided for closing the spout 47, such as cap member 48 which is suitably hinged to the casing section 11 and provided with a spring clamp 49 for engaging a notch in the casing to maintain the cap member in closed position. The cap member 48 may also, as shown, be adapted to permit the release of pressure within the crank chamber while preventing the influx of air or foreign particles into the crank chamber, by means of a check valve disc 50 carried on a pin 51 secured to the cap member, the check valve disc 50 being adapted to seat upon an annular seat rib 52 on casing section 11 and surrounding the opening 47. The valve disc 50 is unseated when the pressure within the crank chamber 8 exceeds atmospheric pressure, a vent port 53 being provided in the cap member 48 to effect the necessary connection to atmosphere.

In accordance with the object of my invention, I provide in the end wall of crank case section 5 an arcuate wall or partition 54 having its apex adjacent the filling opening 47 and provided with an arcuate end flange 55 which forms an arcuate channel or groove 56 above the end opening 9 in casing section 5, into which channel fluid lubricant may flow from filling opening 47 through an opening 57 in the casing section 5. The channel 56 opens at the extremity thereof into a slightly inclined horizontally disposed channel or trough 58 formed on the side walls of casing section 5, which channel extends to bearing chamber 13 and opens thereinto through an opening 59. Thus when fluid lubricant is poured into the filling opening 47, it flows through opening 57, and overflows over the arcuate end flange 55, a portion of the lubricant being retained, however, in channel 56 and conducted by gravity to channel 58 whence it passes into bearing chamber 13 and overflows past bearings 14 into crank chamber 8.

Any suitable means may be provided for ascertaining the depth of the fluid lubricant in the crank chamber 8, such as the threaded opening 60 in the casing section 11, which opening is provided with a screw plug 61 having a gauge stem 62 thereon.

If it is desired to start the compressor, the bearing members 14 being entirely dry either upon first use or after long disuse, fluid lubricant is first poured into the filling spout 47 to provide an immediate supply of lubricant to the bearing members 14 before the crank shaft 15 begins to rotate. Upon rotation of the crank shaft, the bearing members 14, being adequately and properly lubricated, are prevented from being unduly worn, thus obviating the possibility of service or maintenance expenditure in replacing the bearing members due to lack of lubrication on starting.

During the operation of the compressor, the rotation of the crank shaft causes pump 27 to supply fluid lubricant to the connecting rod bearing 29, the lubricant passing through the space between the bearing 29 and the crank pin 21 and being centrifugally thrown out into the crank chamber 8, so that a portion is returned immediately to the lubricant in the crank chamber and a portion, caught by the channel 58 in the side wall of casing section 5, flows by gravity to the bearing chamber 13.

Thus a continuous supply of fluid lubricant past the crank shaft bearing members 14 to the crank chamber 8 is effected during the operation of the compressor.

It will thus be seen that I have provided simple and effective means for ensuring initial proper lubrication of the crank shaft bearings without waiting for a supply of lubricant to be fed to the bearings as is necessary in the usual splash or pumping systems.

While I have illustrated but one embodiment of my invention and have described it in its application to a fluid compressor, it will be understood that my invention is applicable to any type of rotating apparatus and may be modified without departing from the spirit thereof. It is not my intention, therefore, to limit the scope of my invention except as required by the prior art and as defined in the appended claim.

Having now described my invention, what I claim as new and desire to secure by Letters Patent, is:

In combination, a casing having a chamber and a horizontal filling opening through which fluid lubricant intended for said chamber must pass, a shaft rotatable in the chamber, a bearing chamber in the casing having a bearing for supporting said shaft, an open channel on the interior surface of the casing within said chamber, one end of the channel opening into the bearing chamber and the other end being so disposed that the said horizontal opening enters the channel thereby causing fluid lubricant supplied through the opening to first fill the channel to provide an initial supply of lubricant to the bearing chamber and bearing and then overflow into said chamber, said channel having a portion which drops sharply from the filling opening in the casing to insure initial flow of lubricant in the channel to the bearing chamber and bearing and having also a portion, connecting the bearing chamber and the lower end of the sharply dropping portion, which is inclined slightly from the horizontal, said slightly inclined portion being effective to collect fluid lubricant thrown up from the lubricant contained in the chamber by rotation of the said shaft and to conduct, by gravity, the lubricant so received therein, to the bearing chamber and bearing to maintain a supply of lubricant thereto while the shaft rotates.

PHILIP L. CRITTENDEN.